(12) United States Patent
Fain

(10) Patent No.: US 10,362,894 B2
(45) Date of Patent: Jul. 30, 2019

(54) GLOBALLY NETWORKED ON-DEMAND COFFEE BLENDING AND BREWING SYSTEM

(71) Applicant: Gerald S. Fain, Framingham, MA (US)

(72) Inventor: Gerald S. Fain, Framingham, MA (US)

(*) Notice: Subject to any disclaimer, the term of this patent is extended or adjusted under 35 U.S.C. 154(b) by 154 days.

(21) Appl. No.: 15/106,527

(22) PCT Filed: Dec. 22, 2014

(86) PCT No.: PCT/US2014/071953
§ 371 (c)(1),
(2) Date: Jun. 20, 2016

(87) PCT Pub. No.: WO2015/095877
PCT Pub. Date: Jun. 25, 2015

(65) Prior Publication Data
US 2016/0338525 A1    Nov. 24, 2016

Related U.S. Application Data

(60) Provisional application No. 61/919,167, filed on Dec. 20, 2013, provisional application No. 61/919,325, (Continued)

(51) Int. Cl.
*A47J 31/40* (2006.01)
*A47J 31/44* (2006.01)
(Continued)

(52) U.S. Cl.
CPC .......... *A47J 31/42* (2013.01); *A23F 5/08* (2013.01); *A23F 5/26* (2013.01); *A47J 31/002* (2013.01);
(Continued)

(58) Field of Classification Search
CPC .......... A47J 31/20; A47J 31/40; A47J 31/007; A47J 31/3614; A47J 31/404
See application file for complete search history.

(56) References Cited

U.S. PATENT DOCUMENTS 6,228,410 B1 *  5/2001  Zajac .................. A47J 31/52
                                                  426/433
8,688,277 B2 *  4/2014  Studor ................ A47J 31/44
                                                  422/62
(Continued)

FOREIGN PATENT DOCUMENTS

WO    WO-01/12039 A2    2/2001
WO    WO-2012/083194 A2  6/2012

OTHER PUBLICATIONS

Lakeside Coffee NPL, published Apr. 15, 2011, https://web.archive.org/web/20110415022229/http://lakeside-coffee.com/our_coffee/shop// (Year: 2011).*
(Continued)

*Primary Examiner* — Dana Ross
*Assistant Examiner* — Lawrence H Samuels
(74) *Attorney, Agent, or Firm* — Behmke Innovation Group LLC; James Behmke; Stephen D. LeBarron

(57) ABSTRACT

The techniques described herein provide a globally networked on-demand coffee blending and brewing system. In particular, the system herein can hold coffee beans of distinctly different origins and taste profiles in sealed environmentally controlled "smart hoppers", and can dynamically grind and blend any combination of available beans based on "flavor profiling" to create a user's desired cup of coffee. Additionally, the network connectivity of the system herein provides advanced collaboration within the coffee community, such as for sharing coffee blends, providing feedback to all levels of the supply chain, and indicating fair trade authenticity.

9 Claims, 9 Drawing Sheets

Related U.S. Application Data filed on Dec. 20, 2013, provisional application No. 61/919,332, filed on Dec. 20, 2013, provisional application No. 61/919,338, filed on Dec. 20, 2013, provisional application No. 61/919,341, filed on Dec. 20, 2013.

(51) Int. Cl.

| | | |
|---|---|---|
| *A47J 31/42* | (2006.01) | |
| *A47J 31/52* | (2006.01) | |
| *A23F 5/08* | (2006.01) | |
| *A23F 5/26* | (2006.01) | |
| *A47J 31/00* | (2006.01) | |
| *G06Q 50/00* | (2012.01) | |

(52) U.S. Cl.
CPC ............ *A47J 31/007* (2013.01); *A47J 31/40* (2013.01); *A47J 31/44* (2013.01); *A47J 31/52* (2013.01); *G06Q 50/01* (2013.01)

(56) References Cited

U.S. PATENT DOCUMENTS

| | | | |
|---|---|---|---|
| 2007/0068393 A1 | 3/2007 | Nosler et al. | |
| 2008/0175963 A1* | 7/2008 | Pope | A47J 31/44 426/231 |
| 2008/0201241 A1 | 8/2008 | Pecoraro | |
| 2009/0095165 A1* | 4/2009 | Nosler | A47J 31/007 99/289 R |
| 2009/0105875 A1* | 4/2009 | Wiles | G07F 9/026 700/239 |
| 2009/0158937 A1* | 6/2009 | Stearns | A47J 31/41 99/280 |
| 2011/0212229 A1* | 9/2011 | McLaughlin | A47J 31/3614 426/231 |
| 2012/0156339 A1* | 6/2012 | Studor | A47J 31/44 426/231 |
| 2013/0087050 A1* | 4/2013 | Studor | A47J 31/52 99/285 |
| 2013/0133520 A1* | 5/2013 | Hulett | A47J 31/40 99/285 |
| 2014/0332433 A1* | 11/2014 | Lyall, III | A47J 41/0094 206/459.1 |

OTHER PUBLICATIONS

Guide 2 Coffee: The Ultimate Guide to Coffee, Blog "The Correct Storage of Coffee Beans".; May 5, 2012; http://guide2coffee.com/guide-2-coffee-1/2012/05/20/correct-storage-of-coffee-beans (Year: 2012).*

Extended European Search Report dated Oct. 20, 2017 in connection with European Application No. 14 87 1560.

* cited by examiner

AUTHENTICATED FAIR TRADE RECEIPT 1000

EL SAVADOR SHG NATURAL SANTA RITA COFFEE 1010

| PRINCIPLE 1010 | COMPLIANCE 1020 |
|---|---|
| HUMAN RIGHTS | YES |
| LABOR RIGHTS | YES |
| CERTIFICATIONS | NO |
| PRODUCT DETAILS | YES |
| ENVIRONMENTAL STEWARDSHIP | YES |
| HUMAN HEALTH | YES |
| SUSTAINABLE CIVIL SOCIETY | YES |
| LEGALLY OPERATED | YES |

FIG. 10

GLOBALLY NETWORKED ON-DEMAND COFFEE BLENDING AND BREWING SYSTEM

RELATED APPLICATIONS

This application is a U.S. National Phase application of International Application No. PCT/US2014/071953, filed on Dec. 22, 2014, entitled "Globally Networked On-Demand Coffee Blending and Brewing System", by Gerald S. Fain, the contents of which are incorporated herein by reference.

The present disclosure also claims priority to the following U.S. Provisional Patent Applications, each filed by Gerald S. Fain on Dec. 20, 2013, the contents of each of which are incorporated by reference in their entirety herein:

U.S. Provisional Patent Application Ser. No. 61/919,167, entitled "Automated and Internet Connected Coffee Machine";

U.S. Provisional Patent Application Ser. No. 61/919,325, entitled "Coffee Machine Network";

U.S. Provisional Patent Application Ser. No. 61/919,332, entitled "Coffee Bean Flavor and Blending System";

U.S. Provisional Patent Application Ser. No. 61/919,338, entitled "Food Storage Container with Sensors"; and U.S. Provisional Patent Application Ser. No. 61/919,341, entitled "Supply Chain Authentication System".

TECHNICAL FIELD

The present disclosure relates generally to coffee blending and brewing, and, more particularly, to a globally networked on-demand coffee blending and brewing system and associated technologies.

BACKGROUND

Over 300 million people drink hot coffee every day of the year. After water and milk, coffee is one of the most commonly consumed beverages in the world. The United States is largest market but is ranked about 20th in per capita worldwide consumption. Coffee is gaining popular acceptance in Japan, South Korea, China, and India. The market is well established in most of Europe with per capita consumption rates highest in Finland, Norway, Denmark, Netherlands, and Sweden. Coffee has scientifically proven health benefits and is the leading commodity in the fair trade movement. Making brewed coffee is practiced worldwide, and the blending of coffee beans is an established art and business. At the same time, however, the global artisan coffee industry is growing (micro-roasting) as is the global demand for specialty coffee.

SUMMARY

The techniques described herein provide a globally networked on-demand coffee blending and brewing system. In particular, the system herein can hold coffee beans of distinctly different origins and taste profiles in sealed environmentally controlled "smart hoppers", and can dynamically grind and blend any combination of available beans based on "flavor profiling" to create a user's desired cup of coffee. Additionally, the network connectivity of the system herein provides advanced collaboration within the coffee community, such as for sharing coffee blends, providing feedback to all levels of the supply chain, and indicating fair trade authenticity.

Other specific embodiments and implementations are described in greater detail below, and this brief summary is not meant to be limiting to the scope of protection of the invention described herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 10 illustrates an example fair trade receipt.

DETAILED DESCRIPTION OF EXAMPLE EMBODIMENTS

Figure 1:
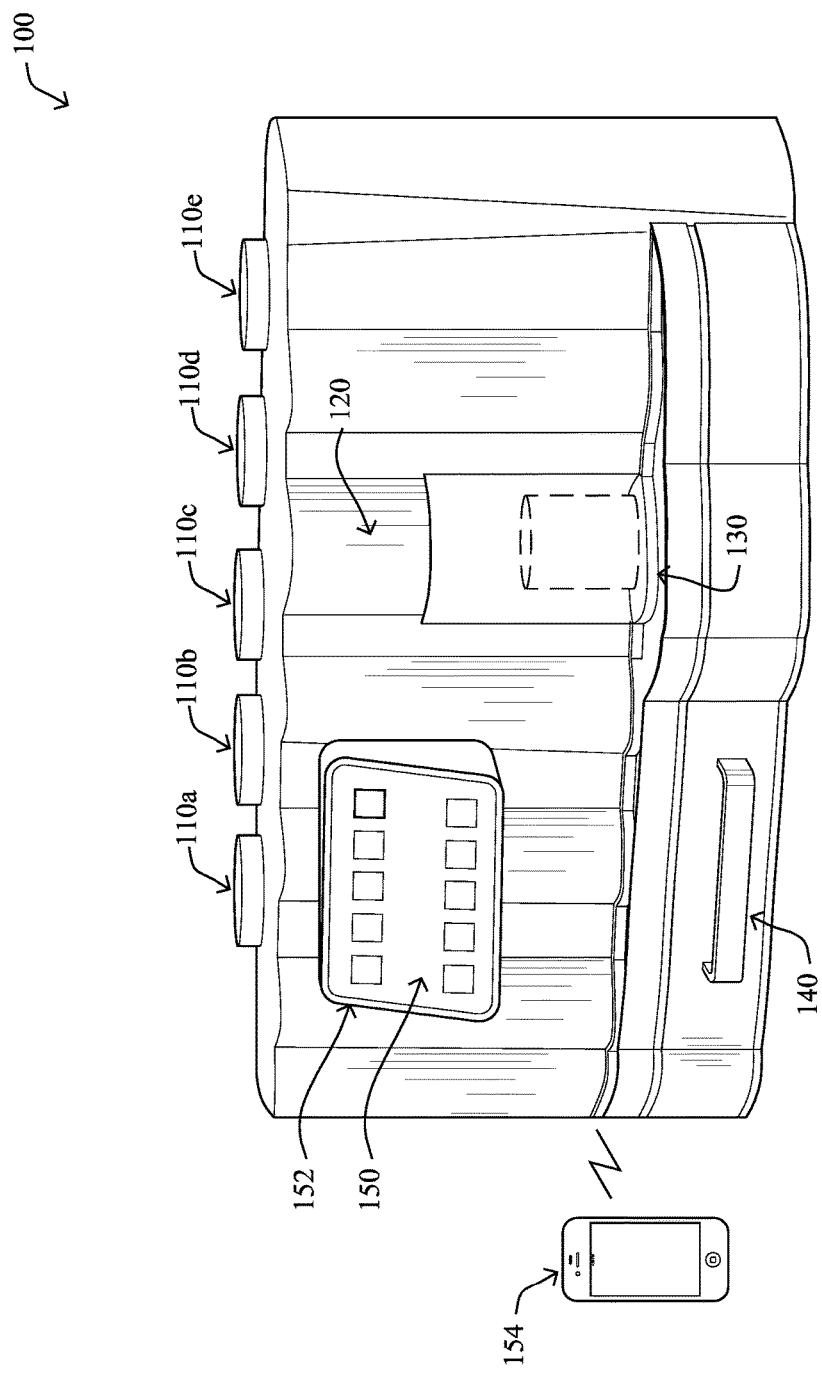
FIG. 1 illustrates an example globally networked on-demand coffee blending and brewing system.

FIG. 1 illustrates an example globally networked on-demand coffee blending and brewing system 100 (also known more simply as a coffee maker or machine 100), which generally consists of a plurality of coffee bean "hoppers" 110 (e.g., 110a-e) arranged in a manner and in a system that provides advanced technological features (and each fitted with a weight-release chamber and a dedicated grinder, described below). A brew chamber 120 accepts the coffee for brewing into a cup (placed on cup holder platform 130), and a collection bin 140 can accept the spent grounds. As an intelligent coffee maker, the system 100 also comprises a user interface 150 (e.g., a display and touch screen, with optional voice input), which may comprise a credit card reader 152 for commercial implementations, as well as an interface for receiving local (e.g., wireless) communication or Internet-based communication from various user devices 154 (e.g., smartphones, tablets, laptops, computers, etc.). Generally, the machine 100 is a fully automatic coffee maker, particularly suited for the home, office, and specialty food café. An illustrative size may be approximately 16 inches high, such that it fits neatly under a standard kitchen cabinet.

Figure 2:
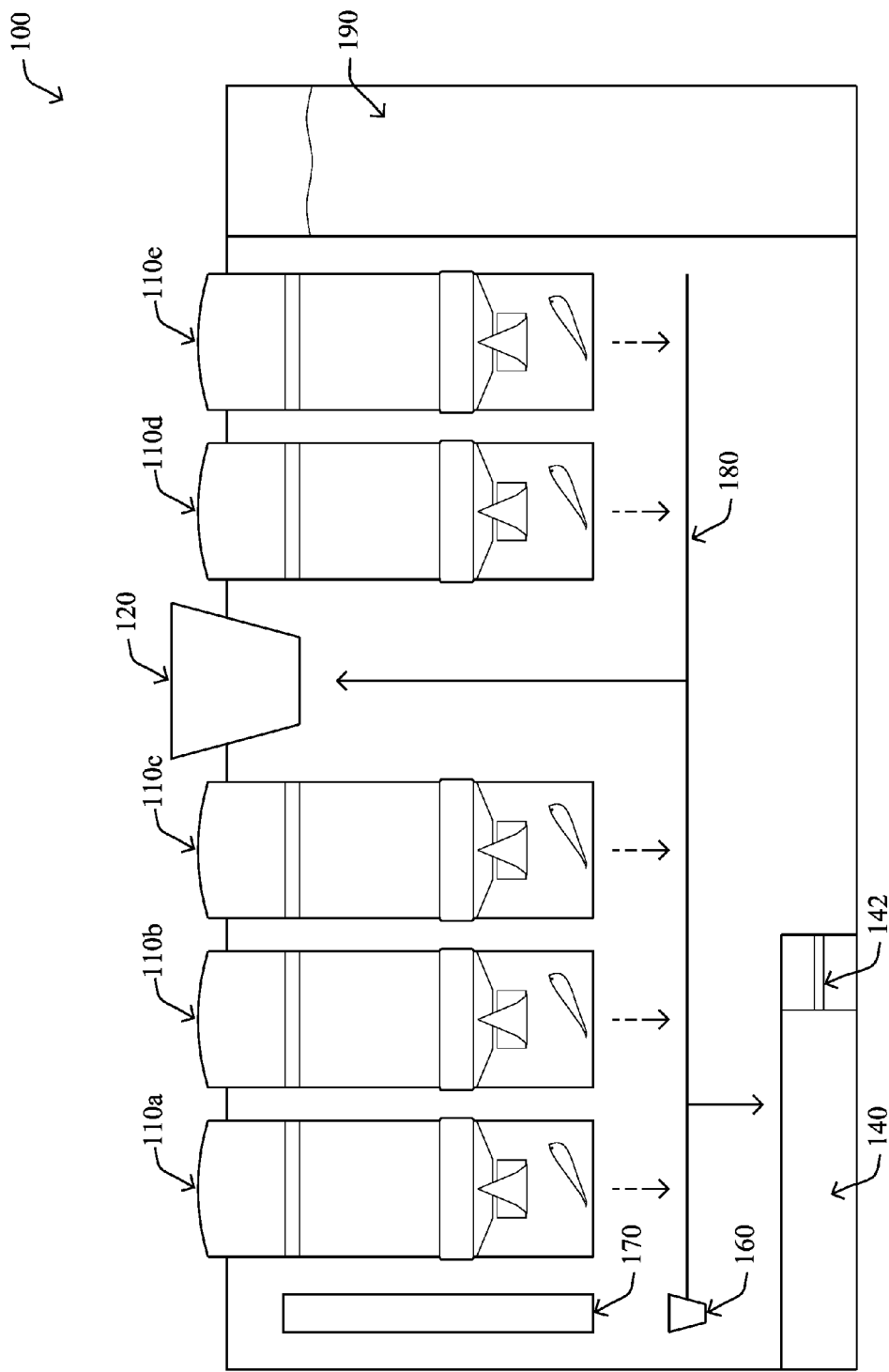
FIG. 2 illustrates an schematic internal view of the example globally networked on-demand coffee blending and brewing system.

As an alternative view, FIG. 2 illustrates a schematic cutaway view of the system 100, where a conveyance system comprises a coffee (e.g., grounds) container 160, which may accept disposable filters 170 in an illustrative embodiment, and receives coffee (e.g., ground) from individual hoppers 110 through a transport system 180 (e.g., rails, conveyors, etc.), which can be brought to the brew chamber 120. The water supply 190 may pass through a tank and boiler for hot water (e.g., 205 degrees Fahrenheit or more on demand), and into the brew chamber with adjustable controls for water or air injected turbulence for agitation of particles and brew/saturation time. The used grounds (e.g., and filter) may then be transported to the collection bin 140, and illustratively compressed by a compressor device 142.

The conveyance/transport system 180 is used to connect the collection cup/bin 160 to the brew chamber 120, as necessary and depending on the particular arrangement of the machine 100. Though the preferred embodiment grinds the coffee as part of the hoppers 110 and transports the grounds (more precision), alternative embodiments may transport whole beans for grinding at a shared grinding location (less precision, but less mess). In addition, the collection bin 140 is configured to hold ground coffee particles (disposed automatically after brewing), where the used coffee grounds can be compressed inside of the paper filter used to produce the brewed coffee, dropped into a hold compartment 140 of the machine, and used at some time in the future for a secondary useful purpose, such as for plant fertilizer, bio-fuel, or other productive purpose.

According to the techniques herein, an "exact measure" chamber is a unique feature of the machine 100. Brewing selected ground beans with properly filtered water, both of which in generally exact proportions, makes the most highly valued cup of coffee. While the science of water filtration is well established, the automated process (technology and mechanisms) for selecting roasted coffee beans to be blended and properly ground in the desired proportions is not. By example, to produce on-demand an 8-ounce cup of brewed coffee from a blend of ⅓ Columbian, ⅙ Costa Rican, ⅙ Kenyan, and ⅓ Mexican Decaffeinated, this machine is required to create an equation that will produce that blend in the proper proportions based on the weight of the respective individual ground beans of coffees matched to the ounces of water per brew. Individual coffee beans vary in size and weight. The weight is determined in part by water moisture retained in the bean. Therefore, even with a single varietal of coffee beans the exact measures (ground coffee to water ratio) are achieved by weight alone. The "exact measure" chamber triggers the release of the exact amounts of ground from the bins while controlling the grinding, and releases that exact measure into the filtered brew chamber.

Figure 3:
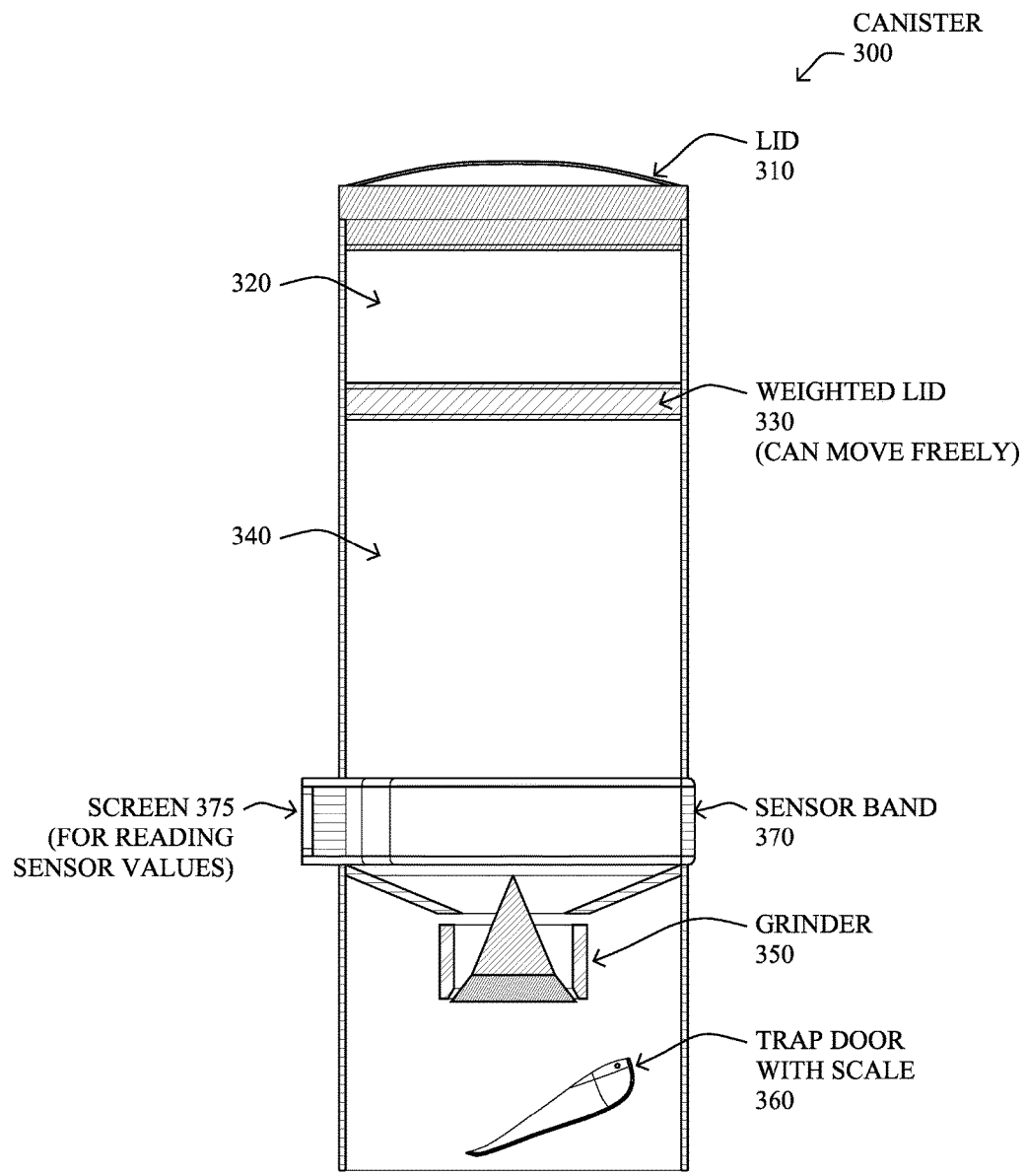
FIG. 3 illustrates an example "smart" hopper.
Figure 4A:
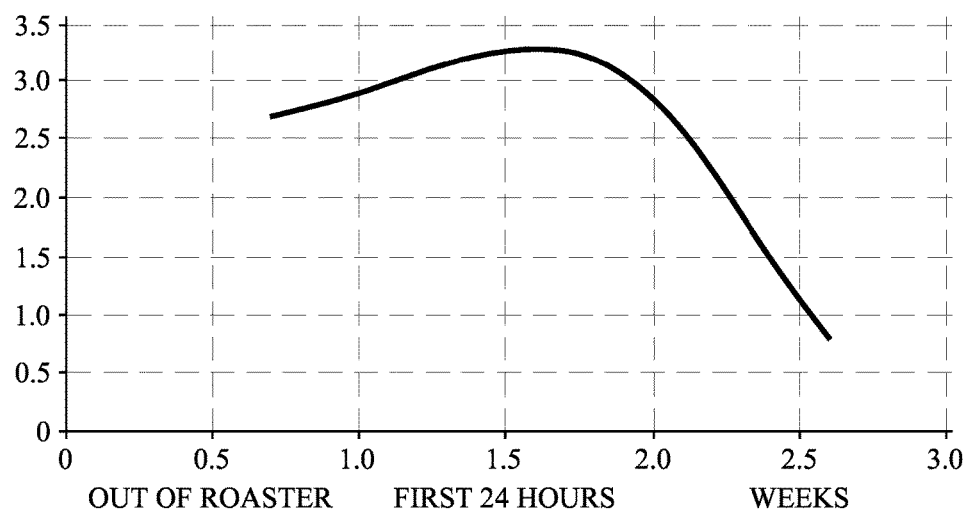
FIGS. 4A-4B illustrate example staling curves.
Figure 4B:
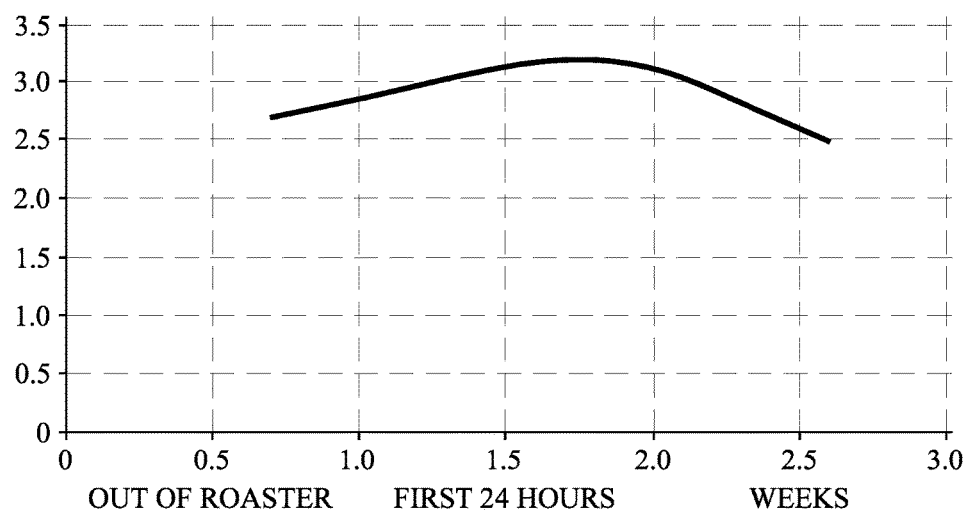

In particular, in one or more embodiments herein, the hopper 110 is an illustrative "smart" hopper, such as the smart hopper 300 shown in FIG. 3, which may be a mechanical container of desired shape and volume designed to hold foods such as coffee (e.g., roasted beans) in a sealed and environmentally controlled manner, where contents are protected from the elements that contribute to staling and spoilage. For instance, such elements include but are not limited to gases (e.g. $CO_2$), moisture, heat, and light. For instance, with reference to FIGS. 4A and 4B, an example "staling curve" 400 is shown (e.g., from roasting time, to the first 24 hours, to the following weeks), particularly where no controls are used in FIG. 4A (e.g., roasted coffee beans left out in the open or in ventilated bags) versus when controls are in place in FIG. 4B (e.g., using the sealed hoppers as described herein.

Referring again to FIG. 3, the illustrative smart hopper 300 comprises a top/cap 310 to seal in a chamber 320 (e.g., with an optional degassing feature such as nitrogen and/or argon gas flushing), where within the chamber an optional weighted (or sprung) interior lid 330 may compress beans (or other product) 340 toward the associated egress, in this case a grinder 350 and associated catch tray (with scale) 360. Note that the hopper 300 may comprise the grinder 350 and subsequent catch tray 360 as integrated components (e.g., a reusable container), or else the hoppers 300 may attach to a to a separate but dedicated grinder and weight-release catch tray. Alternatively, the grinder/catch tray sections may be an integral component of the coffee maker 100, into which the hoppers 300 connect.

The grinder 350 may consist of standard burr sets and a motor, where the whole beans are stored for freshness as grinding on demand produces the best coffee. (Note, the machine can also be designed to store ground coffee if required by the particular application and embodiment). The grinders may be configured and/or controlled to produce the exact particle size and texture required, and the particles are then ready for intended use with state of freshness reported in advance of grinding. Since the system herein weighs coffee (as opposed to counting beans or measuring by volume), the weight-release chamber comprises a catch tray 360 with associated scale, such that on customer command, the machine can select by proportion an exact amount (mass/weight) of contents (e.g., beans) needed from each of the hoppers to produce the desired output. The required amount of ground beans may then be dropped from the hopper into the cup 160. Alternatively, whole beans may first be measured and then ground, i.e., swapping the order of the grinder 350 and the catch tray/scale 360, however, greater precision can be achieved by weighing the grounds as opposed to the beans. Note that grinding the coffee from hoppers 110 creates "fines", and is generally messy, so provisions should be taken to allow for ease of cleaning and for reducing the uncontained nature of the fines, such as only grinding while the catch cup 160 is beneath the corresponding hopper 110 (to catch the fines).

As described in greater detail below, the use of the individual hoppers 110/300 and the precision weight-release chambers (grinder 350 and catch tray/scale 360) allows for calculating exact measures produced by each of the grinders, such as, for example, 20% from hopper #1 (110a), 30% from hopper #2 (110b), and 50% from hopper #3 (110c). That is, as described below, the techniques allow mixing an exact measured proportion of different coffee beans (e.g., even mixing caffeinated ground coffee with decaffeinated ground coffee) for making a single cup of coffee, and in various volumes (e.g., 8 ounces, 12 ounces, 16 ounces, etc.).

In accordance with one or more specific embodiments herein, an optional sensor circuitry arrangement 370 and user interface screen 375 may be used to determine and report freshness data from the time the contents (e.g., beans) are added to the hopper until empty. In other words, the sealed storage container 300 monitors for various factors, such as, for coffee beans for example, degassing, temperature, moisture, light, and other influences that account for staling of the beans, and a display 375 on the hopper reports the history of each factor monitored over time. In general, the smart hopper is designed to prolong product (e.g., bean) freshness.

The illustrative storage container 300 in this specific embodiment has a number of useful benefits. First, it confirms the "freshness status" of contents in real time. For example, roasted coffee beans are bagged and then date stamped. The federal laws do not regulate date stamping. Therefore, it is common to date stamp one-year "best used by" dates on bags of coffee beans sold in retail stores. With this container a customer will know if the beans meet criteria for freshness, since once the beans are put in the container, the associated sensors 370 (e.g., and screen 375 or other indicators, such as LEDs) report the corresponding freshness status. Second, the illustrative container 300 can keep a history of sensor data from the time contents are added until empty. For example, roasted coffee beans stale quickly when exposed to excessive heat. If they are kept by a heat source (e.g., stove or oven) the periodic exposure to extreme heat will be recorded (e.g., in a memory of the sensor components 370) and in that way help to identify the source of the accelerated staling of the beans. Third, the containers 300 may be used as a tool for product testing. For example, when it comes to roasted coffee beans it is not known which of the environmental factors alone or in combination contribute to taste outcomes when making a cup of coffee.

Note that in certain embodiments, the containers 300 may be linked via the Internet to the supply chains. For example, in one embodiment, the Internet link may be through the coffee maker 100, or else may have its own network interface for communication while not connected to a coffee maker (e.g., via circuitry associated with the sensor components 370). By connecting the containers 300 to the Internet, this allows for data collection on sensor data as well as container use, and may facilitate financial transactions, such as by automatically reordering contents (e.g., roasted coffee beans) when those contents are depleted or near depletion.

According to one or more embodiments herein, the intelligent grinder and blender machine 100 may be operated by a technology-sophisticated customer interface 150. This interface may provide a means for communication between the machine and the human user, and may be used for placing a request or order, conducting research, providing feedback, advertising, etc. The interface 150 thus interacts with the machine 100 to allow the creation and enjoyment of custom-blended coffees.

Figure 5:
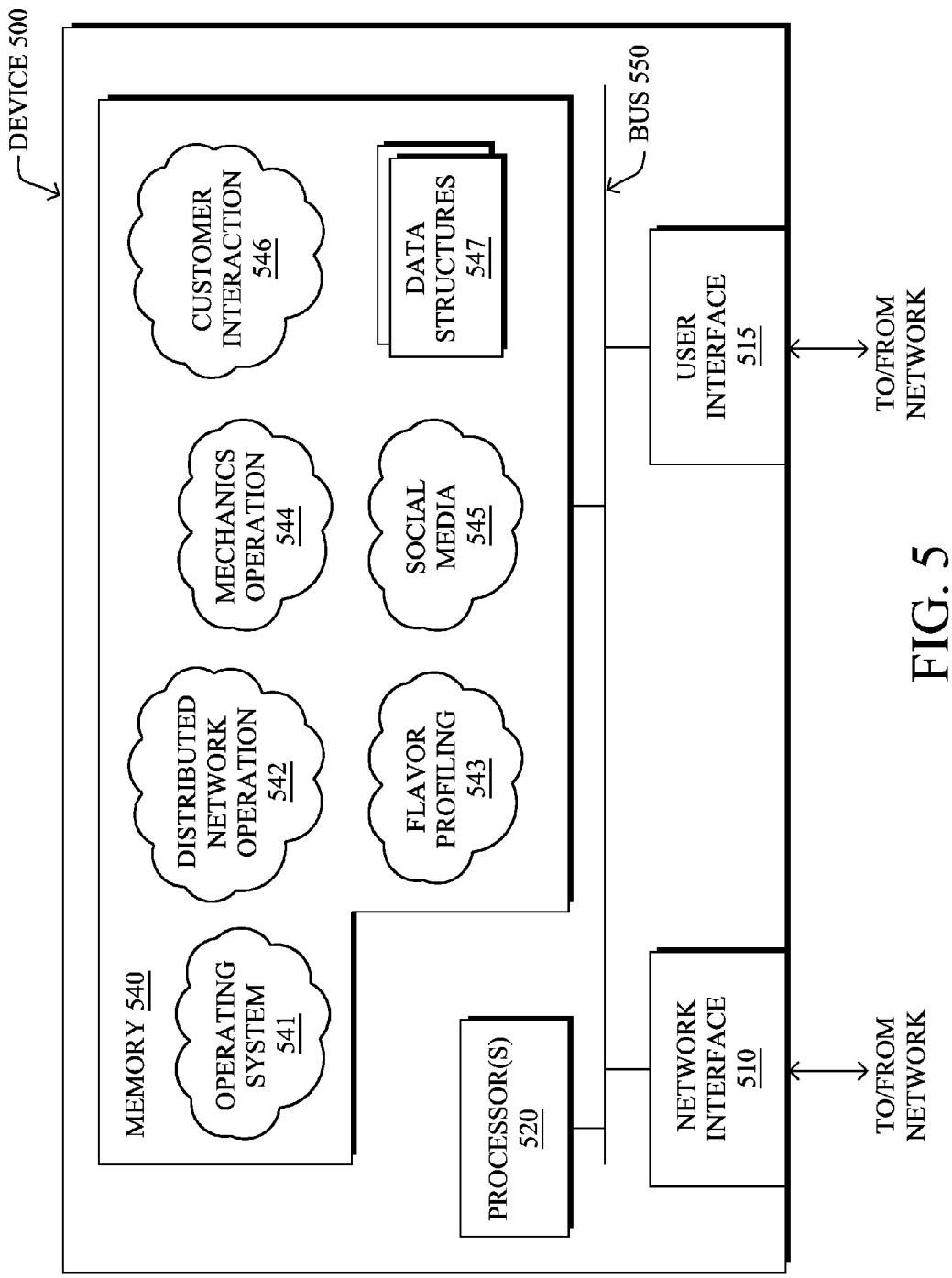
FIG. 5 illustrates an example schematic block diagram of hardware and software for the globally networked on-demand coffee blending and brewing system.

Behind the operation of the machine 100 is the hardware and software required for operability. In particular, FIG. 5 illustrates an example simplified block diagram of such hardware and software for a device 500 configured as the intelligent coffee maker 100 herein. In particular, the device 500 may comprise one or more network interfaces 510 (e.g., wired, wireless, etc.), a user interface 515, at least one processor 520, and a memory 540 interconnected by a system bus 550. The memory 540 comprises a plurality of storage locations that are addressable by the processor 520 for storing software programs and data structures associated with the embodiments described herein. The processor 520 may comprise hardware elements or hardware logic adapted to execute the software programs and manipulate the data structures 547. An operating system 541, portions of which are resident in memory 540 and executed by the processor, may be used to functionally organize the device by invoking operations in support of software processes and/or services executing on the device. These software processes and/or services may comprise, illustratively, a distributed network operations process 542, a flavor profile process 543, a mechanics operation process 544, a social media process 545, a customer interaction (e.g., point of sale) process 546, etc.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In terms of functionality, there are generally three interrelated features of the system 100 herein, where the processes 542-546 contain computer executable instructions executed by the processor 520 to perform such functions either singly or in various combinations. The first general feature is the customer interface (request for a cup of coffee), managed by customer interface process 246. This is an automated and interactive communications system, which may be activated by a smart phone or other remote device 154, voice command in language of choice, and/or touch screen 150. Connections to social media are also potentially robust (e.g., "Jerry likes Toby's recipe—you should try it!"), and managed by social media process 545.

The second feature generally relates to bean flavor profiles and blending recipes, and the actual preparation of such blends. In particular, as described in detail herein, flavor profile process 543 may instruct the mechanics operation process 544 of the machine 100 to create the desired formula/recipe. These data used for such flavor profiles and blending recipes may be stored as data 547, and may be interactive and informed by each customer-created selection, as well as based on the actual beans stored in hoppers 110/300 as well as based on updated flavor profile information over time.

The third feature provides two-way communications and data collection between a centralized host and each machine 100/500 in the field, generally through distributed network operations process 542. Operations include but are not limited to remote machine maintenance, financial transactions, data analytics, supply chain management, advertisement, flavor profile updates, social media (specifically through social media process 545), and coffee bean authentication.

Figure 6:
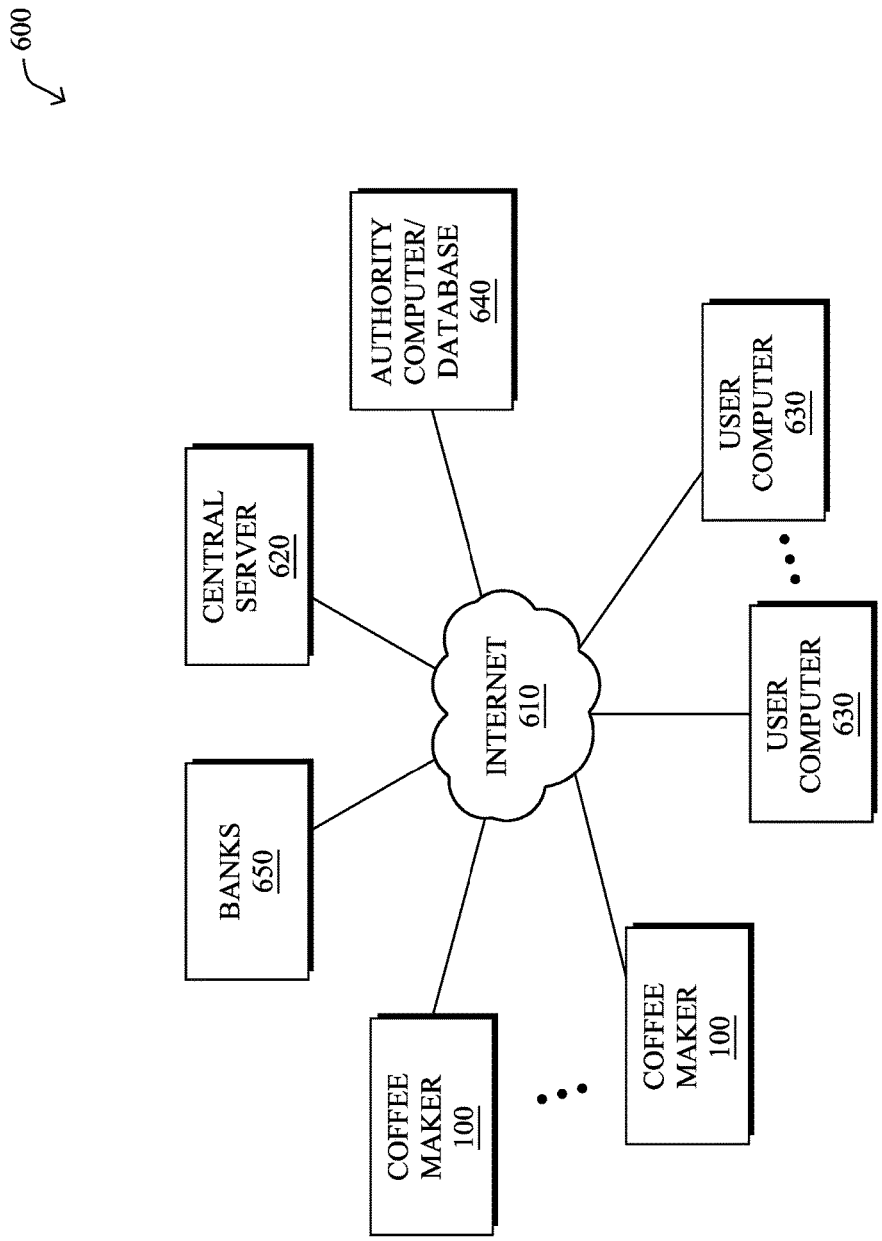
FIG. 6 illustrates an example computer network.

In particular, each machine 100/500 may be Internet connected to a central processing device serving the network of machines. FIG. 6 illustrates an example computer network 600 comprising a plurality of coffee makers/machines 100 interconnected via the Internet 610 to a central server 620. Additionally, various user computers 630 (e.g., customers, farmers, researchers, marketers, etc.) may also be connected, as well as one or more authority computers 640 and banks/financial computers 650. Various well-known public communication protocols may be used to carry the communications between the various devices, both general and application specific, and such information may be encrypted or otherwise protected in a conventional manner.

In general, data stored and maintained by the system (locally to machines 100 and/or servers 620) may comprise data for assets (things: machines, coffee, equipment, etc.), facilities (places: cafes, farms, stores, providers, vendors, etc.), employees (people), customers (people: user information, roast profiles, secured financial information, etc.), operations (actions: finance, shipping, maintenance, etc.), social networking (things: best profile, best café, search for a participating café, etc.), and flavor profiles (beans, blends, recipes, etc.).

Figure 7:
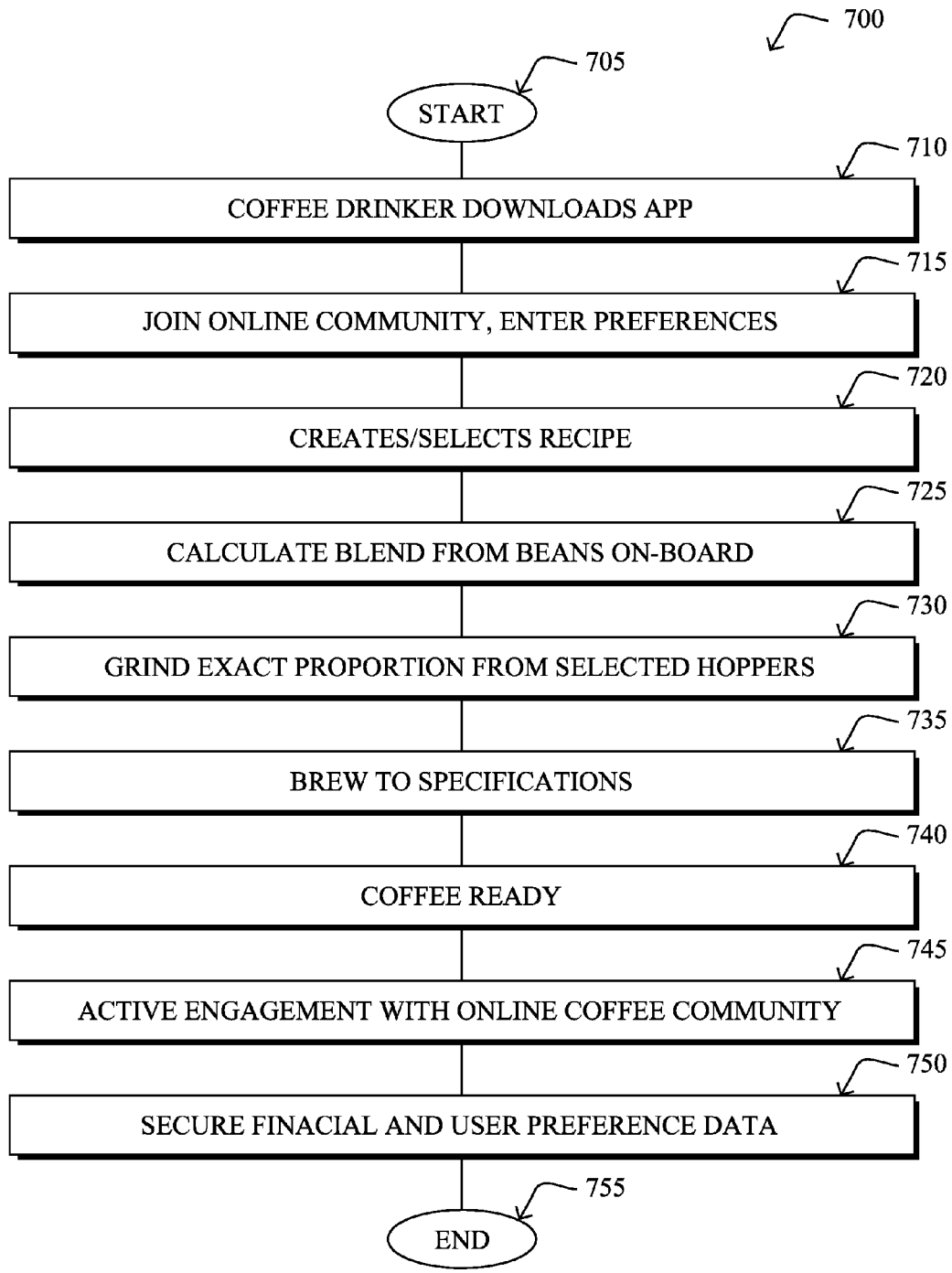
FIG. 7 illustrates an example process for the globally networked on-demand coffee blending and brewing system.

According to one or more of the embodiments herein, the globally networked on-demand coffee blending and brewing system 100 may generally operate according to the illustrative process shown in FIG. 7. Specifically, the illustrative process 700 may start in step 705, and continues to step 710 where a coffee drinker downloads an associated application ("app") on their local device 154. Using the app, or else using the touch screen 150, the coffee drinker (user) may join or log-in to an online coffee community with a user profile and preferences in step 715, or simply enters such user information into a local machine 100 (i.e., without logging in to any communities). In step 720, whether logged in or not, the coffee drinker enters their desired recipe, which may be a stored recipe, or may be selected on-demand at the time of entry. Based on the beans on-board (in hoppers 110), the machine 100 then calculates a formula in step 725 selecting by proportion the exact amount of beans needed from each of the hoppers to produce the selected flavor profile. The required amount of beans is then dropped from the hopper(s) into the grinder and the machine 100 grinds the exact proportions of beans from the selected hoppers in step 730 to produces the exact particle size and texture required. The bean particles are brewed with water heated to exact best temperature is supplied from an on-board filtration system in step 735, where the turbulence of particles and brew time is controlled. Once the coffee is ready in step 740 (typically completed in less than a minute), or else while brewing, the coffee drinker (consumer) may be actively engaged with an online coffee community in step 745, such as for information sharing, feedback, etc. Also, in step 750, financial and/or user preference data may be secured by the local machine 100 or else by one or more corresponding servers 620 for networked devices. The illustrative procedure 700 ends in step 755.

Note that the invention generally concerns making one cup of hot coffee at a time. However, it is also possible to use component parts in the making of un-ground blends of beans, and ground blends of beans in any quantity requested (e.g., a five pound bag of custom blended roasted coffee beans).

The system and techniques herein provide the digital technology and connectivity to transform the coffee drinker's experience. In particular, using a bean flavor profiling system, with a blending operation that is designed as an interactive database, the globally networked on-demand coffee blending and brewing system 100 creates a new community of artisan coffee creation. Using machine learning technology, the techniques herein allow consumer inputs into the knowledgebase of flavor profiling and formula/recipe generation, creating new knowledge otherwise impossible to collect and use in real-time. Furthermore, connections to financial services allow for automated vending and other functions (e.g., a direct deposit of a gratitude from customers to the bank accounts of individual coffee farmers and related fair trade and social justice causes).

Generally, the machine 100 is designed for individual use at home or work site, and in commercial setting as well. For example, in the commercial setting, such as a café or restaurant, the customer fills out a profile card (paper and pencil for scanning by the interface 150, by the touch screen interface 150 itself, or through an internet capable device 154), checking off the desired coffee taste profile. In other words, a user creates a customized profile using the machine or any web browser or app. After answering some simple questions about the user's coffee preferences, the machine can begin processing a flavor blend to meet the user's desires. In particular, the profile can list the coffees offered accompanied with a taste profile, or the list can have just the key word descriptions of coffee profile tastes, thereby giving the machine responsibility for selecting the beans and amounts most closely matching the tastes. The machine allows the mixing of a near infinite number permutations for blend variations depending on the number of coffee varietals loaded into the machine bins 110 combined with the exact proportions requested from each. Using the customizable brewing chamber, and the plurality of on-board bean hoppers 110 (e.g., five), the machine 100 decides which beans to use and customizes the brewing process to create a cup that will most closely meet the user's preferences. Making an on-demand custom blended cup of coffee, until now, has generally been cost prohibitive and otherwise impractical, as it would require the purchase of large quantities of coffee, some of which might never be consumed, and a working knowledge of artisan coffee blending not easily acquired.

The data from the user and mixing formulas may be aggregated in real-time with data from other Internet connected machines anywhere in the world. The customer profile is stored in a database held by the machine, café or restaurant, and may be saved by the customer (e.g., paper copy or on an electronic device). The customer can then work from that profile, anywhere in the world, accessing that profile on any of the connected machines to select the same blend, future blends, or adjusted blends, and may use such blends to create coffees on-demand, or even to order bags of their custom blend, whole bean or ground, to take away. For instance, a key component of the techniques herein is user feedback, where the information related to a particular user's preferences, as well as a feedback loop for varietal variances (e.g., formula translation, described below). For example, an illustrative user-to-machine process may involve any one or more of the following exchanges:

"Did you like the coffee? Great! One click on the app and you can have some of those beans delivered to your house!"

"Want to share your favorite blend? No problem, the app will post it to your social media and allow others to comment, offer suggestions, or use your blend on their local machine!"

"Wish your coffee was stronger, or had a different flavor profile? Just say so, and the machine will make changes for next time."

In addition to making customized blends of coffee on-demand, the data collected on bean storage, the blends selected, and all other outputs, combined with local and remote monitoring of machine operations and maintenance is unique, and makes possible data collection and subsequent analytics for the coffee industry and related businesses in new ways. For instance, the techniques herein track and record supply chain knowledge never before collected and otherwise unavailable (from tree to cup), including consumer access to the same, and provides coffee drinkers with robust social networking functions (e.g., "Michael from North Dakota blends 40% X and 60%Y beans for his morning cup and loves it!" "Jerry from Massachusetts tried 25% X blended with 75% decaffeinated.")

Figure 8:
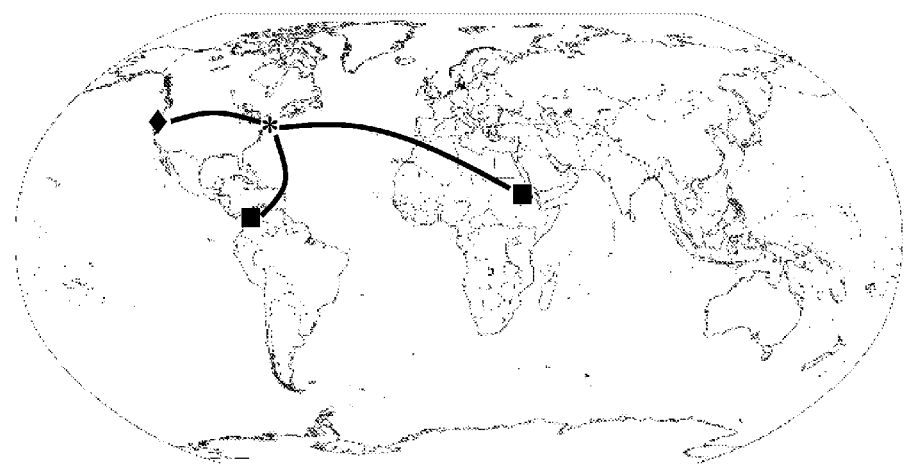
FIG. 8 illustrates an example of global networking for the on-demand coffee blending and brewing system.

As an illustration of the globally functioning operating system herein, FIG. 8 demonstrates the reach afforded by the intelligent coffee system described herein. In particular, not only are bean flavor profiles employed to blend and brew custom coffee on-demand, respecting what matters to specialty coffee drinkers everywhere in the world (selection and amount of varietal bean, grinds size, water temperature, turbulence, and brew time), but the techniques herein create a digital network of coffee stake-holders including but not limited to: coffee drinkers, coffee roasters, coffee brokers, coffee farmers, investors in the coffee business, and related enterprises including fair trade associations, and not-for-profit business. For instance, Internet connections linked to on-line ordering and supply chain authentication allows the coffee-drinker to connect directly to the people who grow and roast. Social media is likewise employed so coffee-drinkers everywhere in the world can share recipes and link to the causes of choice.

As shown in FIG. 8, a user in Boston may share his or her coffee blend recipe with another user in San Francisco (or may use his or her own coffee blend recipe when is visiting San Francisco). In addition, assume that the recipe is a blend of Columbian and Ethiopian beans. The techniques herein allow interconnected communication and feedback, where the user may learn about the farms and farmers that actually produced the beans used for the cup of coffee, and can provide feedback, or even send monetary gratuities. For true coffee aficionados, open communication may be provided between the farmers and the user, connecting the coffee drinker to the coffee source, much like wine tasting has grown to an international travel and experience phenomenon. That is, the use of digital technology in this manner can transform the coffee drinkers' and coffee farmers' experience from an isolated experience (e.g., making morning coffee at home, growing and selling beans without knowledge of their end result, etc.) to a socially connected and emotional experience that adds value to the experience while simultaneously creating value in the supply chains.

As those skilled in the art will appreciate, and as mentioned briefly above, the available beans contained in the hoppers 110 of any given coffee maker 100 can be different at any given time based on supply, preference, availability, etc. There are a large number of blend profiles possible on each separate machine at any given time based on the plurality of selected hoppers 110, such as light roast or dark roast, caffeinated or decaffeinated, etc. However, the techniques herein present customers/users with an otherwise limited number of choices with a nearly unlimited combination of blends otherwise unavailable based on the concept of flavor profiling.

In particular, as will be appreciated by those skilled in the art, coffee is a tropical plant most commonly grown in a tropical band around the globe between the Tropic of Cancer and the Tropic of Capricorn, and there are about 35 countries in this zone around the equator that are regarded as the primary coffee-producing nations. New crops are also being planted successfully in parts of China and in the USA (e.g., California) where changing climate conditions and business opportunities have made coffee farming possible and potentially profitable. Each part of the world, however, has a different bean profile (flavor, aroma, etc.), and the common method for identifying coffee beans is to identify the country of origin, as well as specific regions or sub-regions, growers, and the farms themselves.

is Examples of the many bean varietals currently known within the coffee community include such things as: Arabica beans, Robusta beans, African and Arabian beans (e.g., Angola, Burundi, Cameroon, Congo, Ethiopia, Kenya, Rwanda, Tanzania, Uganda, Yemen, Zambia, Zimbabwe), American beans (e.g., Bolivia, Brazil, Colombia, Costa Rica, Dominican Republic, Ecuador, El Salvador, Guatemala, Haiti Honduras, Jamaica, Mexico, Nicaragua, Panama, Peru, Puerto Rico, Venezuela), Asian, Indonesian and Pacific beans (e.g., Bali, Hawaii, India, Java, Papua New Guinea, Sulawesi, Sumatra, Timor), and so on. In addition, specific types of coffees can be found within each particular region, such as: Sumatra Mandheling beans, Sumatra Lintong beans, Java beans, Yemen Mocha beans, Ethiopian Harrar beans, Ethiopian Yirgacheffe beans, Ethiopian Sidamo beans, Kenyan beans, Jamaican Blue Mountain beans, Hawaiian Kona beans, Sulawesi Toraja beans, Papua New Guinea beans, Tanzania Peaberry beans, Brazil Bourbon Santos beans, Costa Rican Tarrazu beans, Guatemalan Huehuetenango beans, Colombia Excelso beans, Nicaraguan beans, etc.

By no means is this an exhaustive list, and those skilled in the art will appreciate that other types of beans are available around the world. The list above is merely to demonstrate the many different types of beans, where each bean has a different flavor profile and availability.

Custom blending of coffee bean varietals is commonly the work of artisan coffee roasters and large commercial coffee companies. In this way, it has been traditionally a highly secretive business. The roasters, large and small, decide which of the varietal beans to use in the blend and in what proportions. The consumer is left searching the store shelves and cafés for a blend that fits their individual taste. Also, the roaster typically only knows how much of the blend is sold but doesn't necessarily know what blends are most desired by any particular individual or cohort.

The system described herein, particularly in conjunction with the network 600 (e.g., and blending and brewing systems 100), is akin to an interactive digital encyclopedia, and is uniquely designed to collect, hold, analyze, and distribute scientific, archival, anecdotal, and perishable data pertaining to roasted coffee bean flavor profiles. Moreover, this system can then use these data matched with other use data that affect flavor outcomes, including but not limited to: (1) horticultural history of the bean, (2) the methods used in processing the beans, (3) the roasting profile of the bean (heat and time), (4) freshness at time of use (out gassing post roasting), (5) grind particle size and shape, (6) water quality, (7) water temperature, (8) agitation of particles in the process of brewing, and (9) time of particle saturation in the brew chamber. Data fields are herein systematically created and built upon utilizing interactive inputs from (1) experts and laboratories, (2) archival sources, and (3) consensus building sources (e.g., survey, actual customer use data, interviews, and polls). The system herein is designed to collect and then analyze these data from around the world.

Using the locally stored or otherwise obtainable information (e.g., Internet access), the system herein can determine how to make a brewed coffee that meets a specific flavor profile by exact proportion blending of different beans (e.g., "a" "b" and "c" beans), such as through flavor profile process 543. Note that through this information, the system herein may also be capable of translating a given flavor profile into a blending proportion of available beans within the given coffee system's bean supply (e.g., smart hoppers 110/300). For example, if "a" "b" "c" above are not available, the system herein can determine how to approximate that same flavor profile by blending what is available— perhaps "a" "b" and "f" beans in different proportions, ground to a specific particle size, and brewed in a specific manner—controlling machine variables of water temperature, amount and type of agitation of particles in the brew chamber, and saturation time. Based on consumer feedback and/or adjustments, the system could then update its flavor profile database, as well as the worldwide database for use or consideration by other precision blending systems.

Said differently, to accomplish the task of bean flavor blending, a never before possible interactive database is constructed to produce the on-demand permutation requested by the customer (e.g., bean X has these flavor characteristics, bean Y has these flavor characteristics). Therefore, in this example, it is essential that the machine have a processor designed for receiving, storing, and using these flavor profile data on each varietal in residence on the machine to produce what is requested. Given that each machine in the field will have a different array of bean varietals, the machine 100 needs to know how much of each varietal is needed to meet or to approximate the request.

Note that this system could also, by example, prove useful in documenting, challenging, and enriching the cupping and scoring process used by Specialty Coffee Association of America (SCAA) and similar groups around the world that contribute to commodity pricing of green and then roasted coffee bean varietals. There is currently no system for collection and use of these data collected year-round from tasters around the world. Moreover, the information may be used in related fields of market research, commodity trading, on-line ecommerce selling research and technical reports, as well as products, etc.

Figure 9:
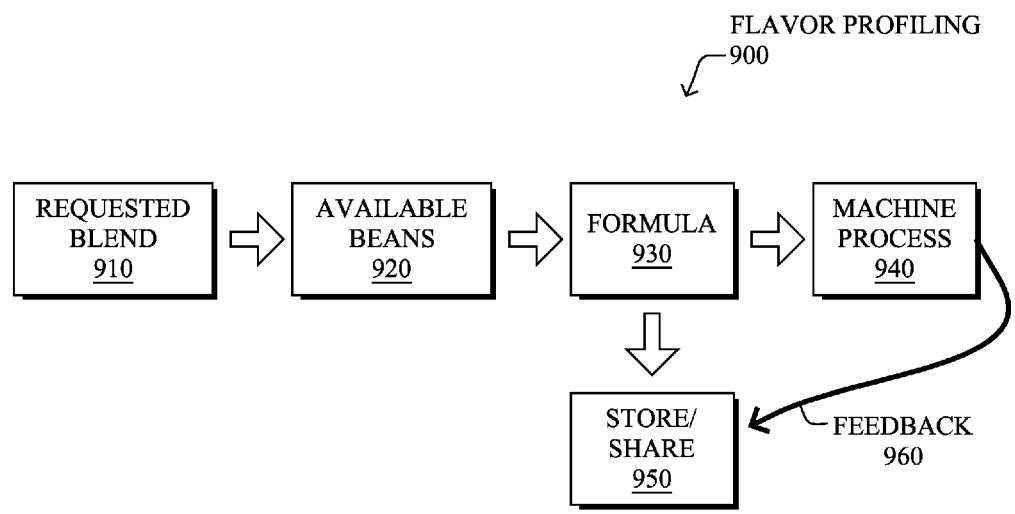
FIG. 9 illustrates an example flavor profiling process.

As an example, FIG. 9 illustrates an example flavor profile process 900, where a specific blend is requested at a local machine 100 in step 910, and then then a comparison to the actual locally available beans is made in step 920. From the locally available beans, a translation (if necessary) is made from the requested blend into a new formula (e.g., a new bean combination, other changes in the brewing process, etc.) in step 930. The formula can then be input into a machine process in step 940 for processing by the local machine 100, and/or may be stored/shared in step 950. Note that the actual brewed cup of coffee may prompt user feedback 960, which can be used to adjust the stored/shared value, such as where the formula needs more tweaking in the event that the flavor profiles are not quite accurate as a matter of taste to a particular user. (Note that it may be possible to reject a requested blend if a valid bean combination is unavailable, or to offer alternatives rather than attempting to match the flavor profile. In a simple example, if a decaffeinated coffee is requested on a machine that has no decaffeinated beans, there is no suitable flavor profile translation.)

As a general example of an embodiment herein, bean flavor profiles may be factory preset in the machine for immediate and basic use. In accordance with the advanced techniques herein, the bean flavor profiles may be routinely updated over time based on adding each customer-created selection, and also based on other updates from worldwide sources (e.g., growers, roasters, the SCAA, etc.). This system makes possible the blending of a yet-to-be-documented number of permutations of bean varietal flavor profiles in combination the specific variables interacting in making a cup of brewed coffee. In particular, using machine learning technology and algorithms, the knowledgebase of bean flavor profiles may be updated based on consumer inputs. This consumer feedback may range from simple confirmation or rejection of a flavor profile translation (e.g., "yes, that combination tasted like what I expected" or "no, that combination was not what I expected"), to consumer formula inputs (e.g., "I find that any X bean can be recreated with a 50/50 blend of Y and Z beans" or "X bean tastes the same as Y bean if you grind it finer and brew it longer", etc.). Based on the user inputs from all over the world, along with provisions and/or safeguards for ensuring accuracy (e.g., one person saying X and Y beans taste the same might be disputed by a larger faction of users), the techniques herein allow for the generation of new knowledge otherwise impossible to collect and use in real-time.

Notably, control over and experimenting with the coffee-making experience has emotional value, as is likewise the case with food preparation and tasting. This emotional experience can be documented when an individual creates a blend and then names it. Creating, naming, and owning blends can be a proprietary opportunity similar in value to the domain and usernames on the Internet, or as business opportunities as established in the cookbook industries. For example, assume that a user "Toby" creates a specific blend of decaffeinated coffee drink that is a specific combination of bean flavor profiles, brewing time, etc., and calls this formula or recipe "Snooze." Not only can Toby recreate "Snooze" on his own local machine, but he can have any other machine across the world make the same or similar cup of coffee based on Toby's specified formula, using the knowledge between the coffee bean varietals and their substitutive qualities where need be. Also, as described above, other users may be able to try Toby's "Snooze" coffee at their local machines, and may find that they like it, and may give Toby credit (e.g., social recognition, cash donations, etc.) for the specified blend as mentioned above, or may also provide their specified varietal variance to Toby or to the community in general (e.g., "Using the flavor profiler, we used 10% Columbian and 15% Kenyan instead of 15% Costa Rican and 10% Mexican beans for a similar taste!").

In accordance with one or more additional embodiments herein, a supply chain auditing (authentication) system produces real-time authentication of product and services. In particular, though coffee is primarily described above, other types of products (e.g., apparel, pharmaceuticals, etc.) and services (e.g., education, medical consultation, leisure, etc.) may also take advantage of the techniques herein. The system employs a dynamic interaction between and among data, combined with end user inputs. These data, collected and analyzed, combine to create findings that instantaneously inform questions about origin, sources, methods, and consequences. Examples of questions that may be answered are such things as:

Where did it come from?
How was it made?
Who made it?
Are all of the entities involved legally operated?
Was the human labor secured and treated with fairness and respect?
What are the known and suspected environmental consequences?
Are the businesses engaged in activities of civic virtue including philanthropy, and if so what have they done?
Is there missing data at any point along the supply chain?
Is the product or service eligible for certification and/or registration and if so is it, or is it not certified and/or registered and if not, why not?

This system, therefore, advances current regulatory practices often under scrutiny for lack of response and accountability. It also attends to the criticisms of voluntary certification programs such as "FAIR TRADE" and "ORGANIC," that never provides the kind of comprehensive and real-time audits made possible by the comprehensive system of supply chain authentication described herein.

The supply chain authentication system serves as a utility platform for commerce and information that it is not product-specific, commodity-specific, industry-specific, service-specific, or specific to a jurisdiction or population. It is by intention a global platform. The outcome values, therefore, optimize findings from otherwise unrelated fields and products from all over the world. By example, adherence to fair labor practice and environmental protection law is an important interest to many people. The system herein is designed for utility across fields of business to enhance human communications as in digital systems (e.g., consumer comments and feedback) and to inform consumer-buying habits. Having dynamic, information-rich, supply chain transparency as described herein can serve as tool in achieving social and economic justice, protecting consumers from illegal and harmful business practice, and in so doing bring attention to corporate and consumer responsibility across fields.

Through the use of supply chain authentication, human labor can be protected, and risks can be reduced for businesses and consumers from unethical and illegal contracting, use of slave and child labor, violations of domestic and international laws, and harm to the natural environment. In addition, consumer information is of particular value, and may be provided prior to sale, at the point of sale, and/or post purchase. Lastly, the techniques herein provide a knowledge platform for worldwide data collection and analysis of best practices, best values, and desired benefits from the product or service, all of which may lead to new products, solutions, and inventions.

Using the components of network 600 above, the techniques herein may facilitate gathering data, performing research, providing data entry points, creating authentication credentials, and so on according to the techniques herein. In particular, in accordance with one or more embodiments herein, using the information obtained above, an illustrative "Fair Trade Receipt" 1000 (or report) as shown in FIG. 10 may be generated for a particular product (e.g., coffee beans, clothing, etc.), where various principles of fair trade may have compliance or grading shown clearly to the consumer. As shown in the example, for a particular identified product 1010 (e.g., bag or canister of beans) various principles 1020 are shown, such as human rights, labor rights, certifications, product details, environmental stewardship, human health, sustainable civil society, legally operated, etc. In general, compliance 1030 for each of the principles may be confirmed and/or graded by a centralized Fair Trade Authority, and may be based on up-to-date, real-time fact checks of governmental authorities and non-governmental organizations (NGOs), public records, and supply chain provider reports monitored and analyzed in detail and reported by third-parties. Various measures may be used to ensure the authenticity of the fair trade receipt 1000, such as difficult-to-reproduce seals or insignia, special cryptographic codes, etc.

As an example, certifications may be based on grants from recognized authorities in the particular industry (e.g., coffee), such as being certified as a particular type of bean (e.g., organic). Product details, on the other hand, require a full description of the product (e.g., the coffee), as well as processing, shipping, preparing (e.g., roasting), and packaging as reported by supply chain associates and verified by a third-party. Also, environmental stewardship may report on the growing conditions of the product (e.g., coffee), respect for land use, enlightened cultivation practices, and compliance with environmental protection laws, confirmed at each point in the supply chain. Other factors, such as human health (e.g., coffee's contributions to human health, good or bad), sustainable civil society (e.g., according to The Universal Declaration of Human Rights (UDHR) indicators), legal operation (e.g., compliance with local rules and regulations), and so on.

The information used for the Fair Trade Receipt may be obtained using search engines directed retrieval of archival records and/or perishable records on each business in the supply chain (e.g., from the network shown in FIG. 6 above). Archival records may comprise legal government databases, news reports, and filed reports made public by the business, while perishable records may require more consistent research (e.g., 24 hours a day, every day of the year), with gathered report findings prior to the data no longer being available. Other sources of authentication information include self-reporting by the businesses, as in a voluntary audit to collect general and specific information on business operations. Further information may be obtained from witness reporting (e.g., paid, voluntary, scheduled, impromptu, etc.).

In accordance with a specific embodiment in relation to the digital and Internet connected automatic coffee machine that blends and brews on-demand as described above, since these machines serve as a hub for the network, they can collect consumer data on the use of coffee varietals, blending recipes, banking and financial services, social media, and coffee science data. In this case, each point of the coffee supply chain, from the farmer to the processor, to the roaster, and the consumer is captured by the supply chain authentication system (e.g., a configured server 620), and may be shared as part of a social network and/or dynamically on the display screen 150 on the coffee maker 100 or at least the individual smart hoppers 110/300. Coffee, in particular, is one of the most actively traded commodities in the world, where growing coffee involves science (horticulture) and the interplay of human and environmental factors (e.g., some of which being out of human control (rainfall, temperature, etc.)). Coffee, or other consumer goods, may therefore be ethically sourced and authenticated as such in real time, and supported by direct communications between farmer, processor, roaster, and consumer.

The techniques described in detail above provide for a globally networked on-demand coffee blending and brewing system and associated technologies. In particular, the techniques herein bring the specialty coffee industry into the digital world, transforming the process from ordering coffee off a menu into a much more personalized and global experience. Customers can use the above-described Internet-connected interface to make exactly what they want (e.g., from "fair trade approved" roasted beans). In addition to being a point-of-sake device, the techniques herein allow the coffee blending and brewing machine to be a data collector for consumer preferences, joining Internet technology with the art of personalized coffee. Educated consumers of specialty coffee will wonder why it has taken so long for the industry to join the interconnected, consumer engaged digital world.

The system and techniques above allow consumers to create and access their own unique and personalized blend of coffee from freshly roasted beans, as well as creating and holding archives of coffee drinkers' data combined with archival and perishable industry data (e.g., commodity selling prices). These data combined and analyzed are of value to the industry and are otherwise not available. The system and techniques serve as a point of education for coffee drinkers in the ways it provides information, instruction, and support. Also, the system and techniques can be used to the advantage of relatively small business entities in the coffee supply chain as it gives them direct access to end uses of their crop.

In addition, people can use the "coffee network" herein without having to access an intelligent coffee maker 100. That is, anyone, in a language of choice, can use this system either as a passive observe or active participant. For example, businesses invested in the fair trade coffee movement could use this network to advance their cause. Others, with commercial interests might use this network for promoting coffee tasting competitions "who can make the best cup of coffee content", for example. Another example is the travel industry that might use this network to promote trips to coffee farms or at least regions of the world where the coffee is grown.

While there have been shown and described illustrative embodiments, it is to be understood that various other adaptations and modifications may be made within the spirit and scope of the embodiments herein. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
   a plurality of coffee varietal hoppers;
   a brew chamber configured to brew measured amounts of one or more coffee varietals;
   a transport system between the plurality of coffee varietal hoppers and the brew chamber configured to transport the measured amounts of one or more coffee varietals according to a coffee blend formula from the plurality of coffee varietal hoppers to the brew chamber;
   a weight-based measurer configured to transfer a measured amount of coffee varietal material from the plurality of coffee varietal hoppers to the transport system;
   a water supply configured to provide water to the brew chamber;
   a processor configured to execute one or more processes to determine the coffee blend formula; and
   a memory configured to store a process executable by the processor, the process when executed operable to:
     receive a requested coffee blend formula having an associated flavor profile;
     in response to the requested coffee blend formula being possible with the plurality of coffee varietals available, blend and brew one or more of the plurality of coffee varietals according to the requested coffee blend formula; and
     in response to the requested coffee blend formula not being possible with the plurality of coffee varietals available:
       determine a translated coffee blend formula from the plurality of coffee varietals available based on the associated flavor profile of the requested coffee blend formula; and
       blend and brew one or more of the plurality of coffee varietals according to the translated coffee blend formula.

2. The apparatus as in claim 1, wherein the weight-based measurer is a component of each of the plurality of coffee varietal hoppers.

3. The apparatus as in claim 1, further comprising:
   a grinder as a component of each of the plurality of coffee varietal hoppers.

4. The apparatus as in claim 1, further comprising:
   a network connection configured to connect to the Internet;
   wherein the process when executed is further operable to communicate flavor profile information over the Internet.

5. The apparatus as in claim 4, wherein the process when executed is further operable to communicate with an online coffee community social network.

6. The apparatus as in claim 1, wherein the plurality of coffee varietals comprises coffee grounds.

7. The apparatus as in claim 1, wherein the plurality of coffee varietals comprises coffee beans, the apparatus further comprising:
   one or more coffee grinders.

8. The apparatus as in claim 7, wherein the process when executed is further operable to measure, blend, and grind in an order of operation dependent upon a physical configuration of the apparatus.

9. The apparatus as in claim 1, wherein the plurality of coffee varietal hoppers comprises replaceable sealed units.

* * * * *